(12) United States Patent
Ly

(10) Patent No.: US 7,683,298 B2
(45) Date of Patent: Mar. 23, 2010

(54) RAISED PLATFORM FOR MICROWAVE COOKING OF A FOOD PRODUCT

(75) Inventor: Bunlim Ly, Chicago, IL (US)

(73) Assignee: Kraft Foods Global Brands LLC, Northfield, IL (US)

( * ) Notice: Subject to any disclaimer, the term of this patent is extended or adjusted under 35 U.S.C. 154(b) by 625 days.

(21) Appl. No.: 11/388,092

(22) Filed: Mar. 23, 2006

(65) Prior Publication Data
US 2007/0221669 A1  Sep. 27, 2007

(51) Int. Cl.
*H05B 6/62* (2006.01)
(52) U.S. Cl. ................................. 219/732; 219/765
(58) Field of Classification Search ......... 219/725–735, 219/762, 763, 759; 426/107, 109, 234, 241, 426/243; 99/DIG. 14; 229/903, 905, 906
See application file for complete search history.

(56) References Cited

U.S. PATENT DOCUMENTS

| | | | |
|---|---|---|---|
| 3,924,013 A | 12/1975 | Kane | |
| 4,190,757 A | 2/1980 | Turpin et al. | |
| 4,279,374 A | 7/1981 | Webinger | |
| 4,703,148 A | 10/1987 | Mikulski et al. | |
| 4,705,929 A | 11/1987 | Atkinson | |
| 4,794,005 A | 12/1988 | Swiontek | |
| 4,801,774 A | 1/1989 | Hart | |
| 4,871,111 A | 10/1989 | Mode | |
| 4,891,482 A * | 1/1990 | Jaeger et al. | 219/730 |
| 4,896,009 A * | 1/1990 | Pawlowski | 219/730 |
| 5,095,186 A | 3/1992 | Scott Russell et al. | |
| 5,144,107 A | 9/1992 | Peleg | |
| 5,223,685 A | 6/1993 | DeRienzo, Jr. | |
| 5,510,132 A | 4/1996 | Gallo, Jr. | |
| 5,688,427 A | 11/1997 | Gallo, Jr. | |
| 5,704,483 A | 1/1998 | Groh | |

FOREIGN PATENT DOCUMENTS

JP    2004359302 A2    12/2004

* cited by examiner

*Primary Examiner*—Quang T Van
(74) *Attorney, Agent, or Firm*—Fitch, Even, Tabin & Flannery

(57) ABSTRACT

A raised platform for a microwave cooking of a food product that includes a support surface, a pair of generally rectangular legs depending from opposing sides of the support surface, a pair of leg extensions attached to each of the generally rectangular legs, and a susceptor surface disposed on the food product support surface for conducting heat to a food product thereon during microwave cooking. The raised platform can be converted between a collapsed configuration, where the legs are generally parallel to the support surface, and an expanded configuration, where the legs are generally perpendicular to the support surface.

19 Claims, 11 Drawing Sheets

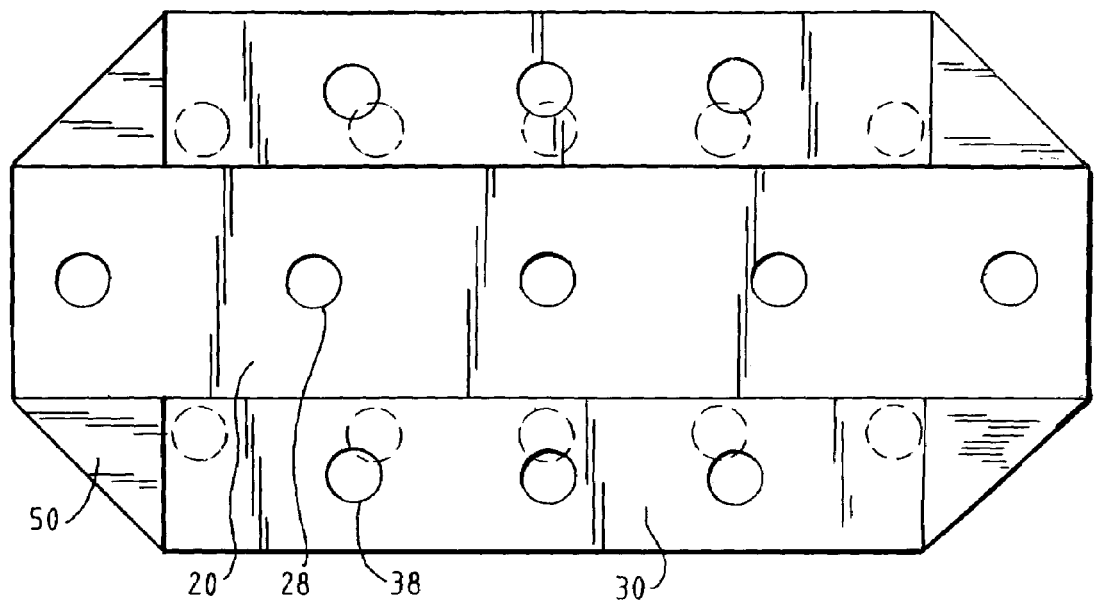
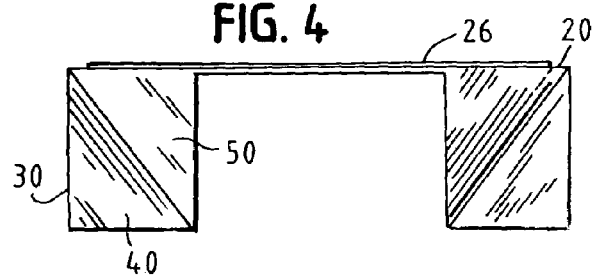
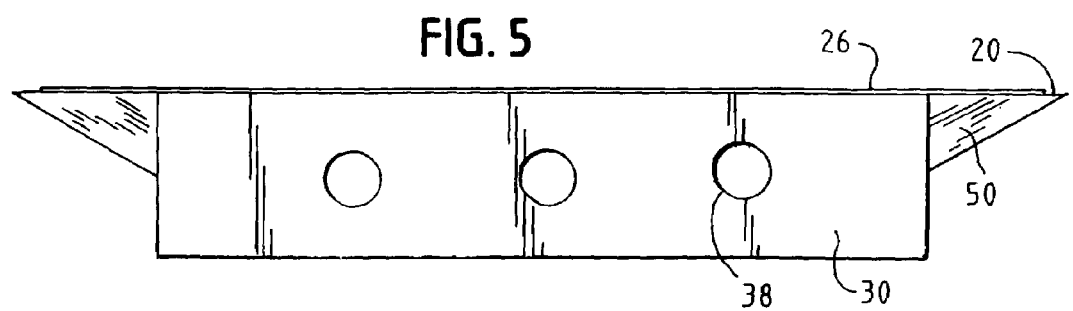

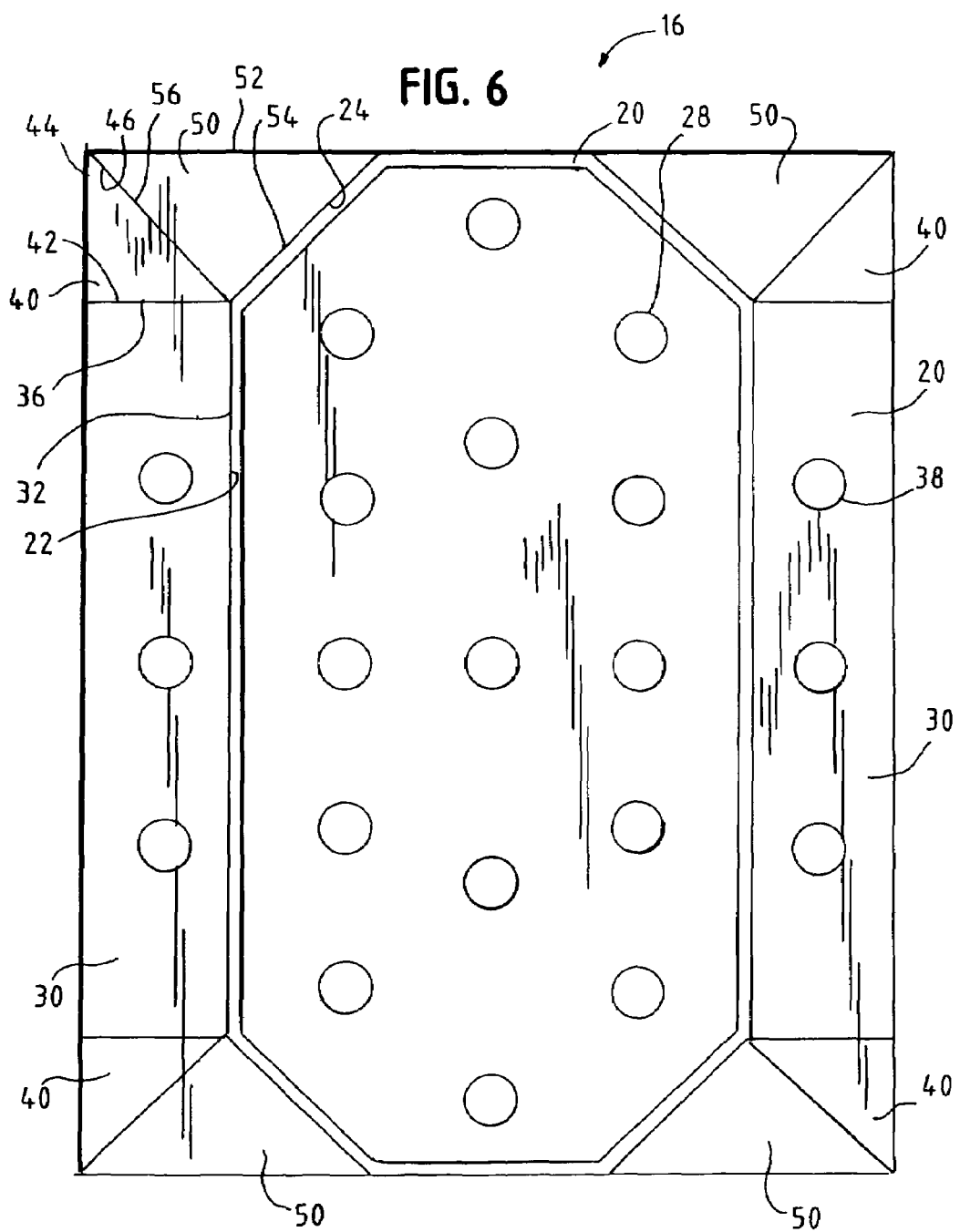

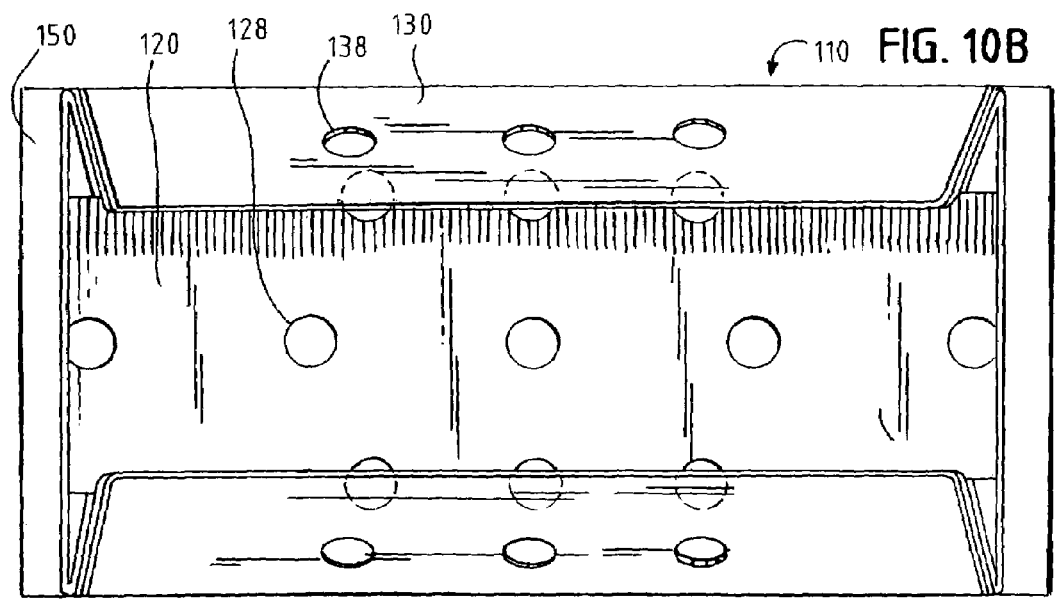
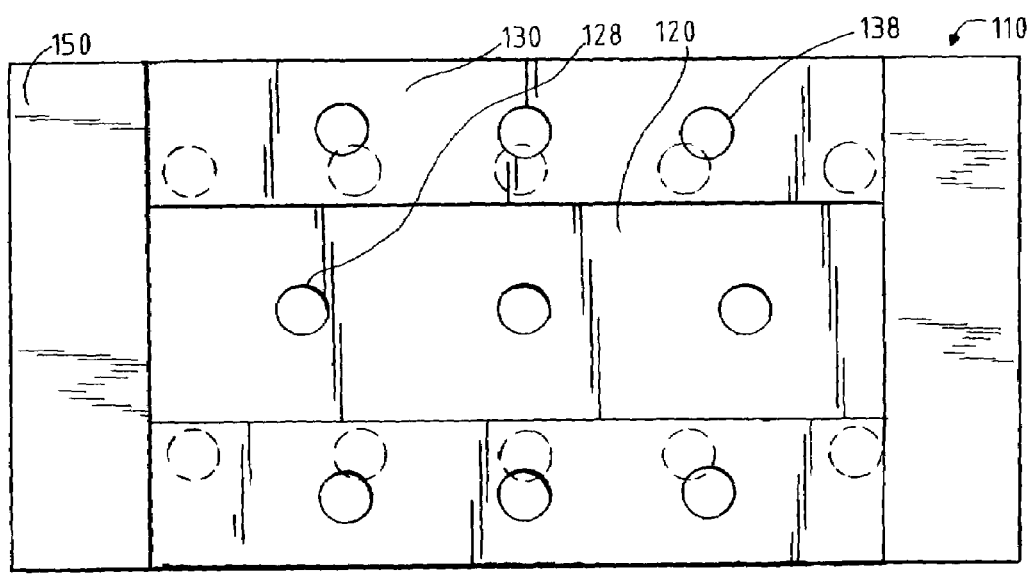

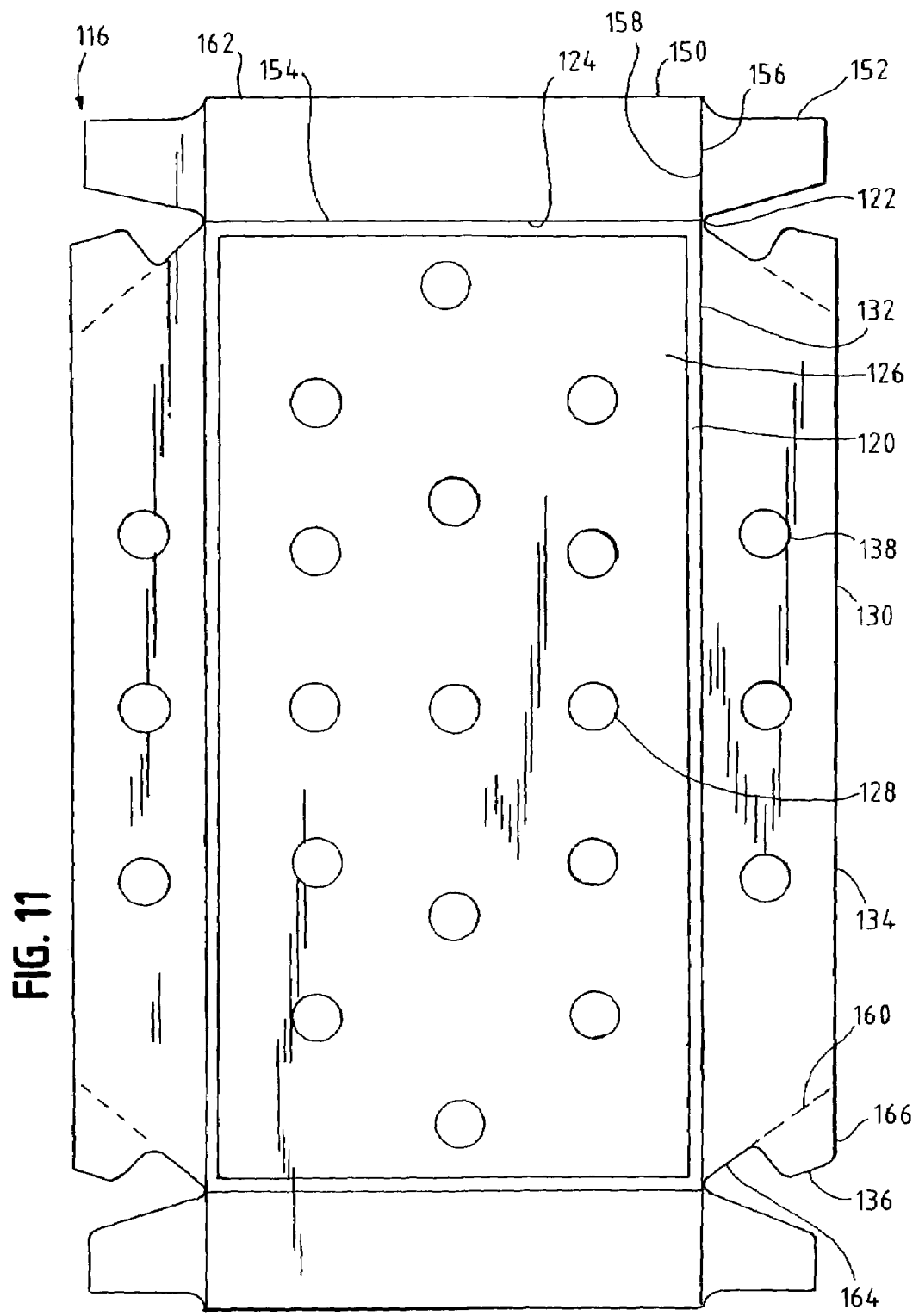

RAISED PLATFORM FOR MICROWAVE COOKING OF A FOOD PRODUCT

FIELD

This disclosure relates to a raised platform for microwave cooking of a food product, and in particular to a raised platform for microwave cooking of a food product that is convertible between a collapsed configuration and an expanded configuration.

BACKGROUND

Heretofore, considerable effort has been expended to provide food products such as frozen or refrigerated pizzas and sandwiches for preparation by a consumer, utilizing conventional gas or electric heated ovens. More recently, with the increasing popularity of microwave ovens, attention has turned to providing consumers with kits and components for preparing dough-containing products such as frozen or refrigerated pizzas and sandwiches.

As has been detailed in U.S. Pat. No. 5,416,304, microwave ovens exhibit their own unique challenges when preparing frozen food products. For example, microwave ovens exhibit substantial temperature gradients or non-uniform heating. In addition, frozen dough-containing products have been found to exhibit a nonuniform temperature response to microwave radiation throughout their volume, during a typical heating cycle. As a result, portions of the food item melt or thaw before other portions and this results in localized accelerated heating due to the preferential absorption of microwave energy by liquids being irradiated. As a result of these and other conditions, further improvements in the preparation and packaging of dough-containing food products are being sought.

SUMMARY

A raised platform for a microwave cooking of a food product is disclosed. The raised platform includes a support surface, a pair of generally rectangular legs depending from opposing sides of the support surface, a pair of leg extensions attached to each of the generally rectangular legs, and a susceptor surface disposed on the food product support surface for conducting heat to a food product thereon during microwave cooking.

In one aspect, the food product support surface is generally planar and may have an octagonal profile for supporting a food product during microwave cooking thereof. The generally planar support surface has a length and a width, with the length being greater than the width. The food product support surface has a pair of substantially parallel opposing side edges that extend along a portion of the length of the support surface. The pair of generally rectangular legs each depend from one of the parallel opposing sides of the food product support surface for supporting the support surface in a raised position. The leg extensions are attached at opposing ends of the generally rectangular legs for providing additional support for the support surface. The susceptor surface may be disposed on the majority of the support surface.

In accordance with other aspects, the support surface and the susceptor surface may have a plurality of aligned vent holes formed therein for venting moisture and/or heat from a food product during microwave cooking. Each of the legs may have a plurality of vent holes formed therein for venting moisture and/or heat from a food product during microwave cooking. In another aspect, the support surface, the leg extensions, and the braces may be formed from a unitary paperboard material. The leg extensions may generally be right isosceles triangles. Each of the leg extensions may be connected along their hypotenuse to an extension leg brace. Each of the extension leg braces may extend between the extension legs and a side edge of the platform adjacent an end of the parallel opposing sides of the support surface. The extension braces may be generally isosceles right triangles. Each of the legs may be connected to one of the parallel opposing sides of the support surface via a fold. The legs may be pivotable about the fold between a first position generally perpendicular to the support surface and a second position generally parallel to the support surface. Each of the leg extensions may be connected to one of the opposing ends of the legs via a fold. And each of the braces may be connected to one of the leg extensions via a fold. Each of the leg extensions and a portion of the connected brace are generally positioned parallel to and between the leg and the support surface when the legs are in their first position. The raised platform for microwave cooking in a food product may include, in combination, a food product. The food product may have a dough based portion with a footprint about the same size as the support surface.

In another aspect, a raised platform is provided for microwave cooking of a food product, where the raised platform is convertible between a collapsed configuration and an expanded configuration. The raised platform includes a generally planar support surface for supporting a food product during microwave cooking thereof, a pair of generally rectangular legs depending from side edges of the support surface for supporting the support surface in a raised position, and a pair of leg extensions associated with each of the legs at opposing ends thereof for providing additional support for the support surface. In a collapsed configuration of the raised platform, the generally rectangular legs and the leg extensions are parallel to the support surface. In the expanded configuration of the raised platform, each of the legs are generally perpendicular to the support surface and each of the leg extensions is positioned in an acute angle relative to the attached leg.

According to an aspect of the raised platform, the support surface and the susceptor surface have a plurality of aligned vent holes formed therein for venting moisture and/or heat from a food product during microwave cooking. In addition, or alternatively, the legs may have a plurality of vent holes formed therein for venting moisture and/or heat from a food product during microwave cooking. In one aspect, the support surface is octagonal. The support surface may have a length greater than its width and legs mounted to side edges of the support surface along the entire length thereof. The side edges to which the legs are mounted are longer than other edges of the support surface.

In one aspect, the extension legs are generally right isosceles triangles. Each of the extension legs may be connected along its hypotenuse to an extension leg brace. Each of the extension leg braces may extend between the connected extension leg in a side edge of the support platform adjacent and end of the parallel opposing sides of the support surface. The extension braces may generally be isosceles right triangles.

In an alternative embodiment, the extension legs may comprise supplemental legs that are attached, such as via a fold, to the product support surface. The extension legs may also be generally rectangular, and may have end tabs that are attached, such as with adhesive, to the legs. A fold line, such as a diagonal fold line, may be formed in the legs at each end adjacent the leg extensions to facilitate folding of the legs and leg extensions between the collapsed configuration and the expanded configuration. Alternatively, the legs may have tabs that are attached, such as with adhesive, to the leg extensions and a fold line may be formed in the leg extensions.

Each of the legs may be connected to one of the parallel opposing sides of the support surface via a fold. The legs may be pivotable about the fold between a first position generally perpendicular to the support surface and a second position generally parallel to the support surface. Each of the leg extensions may be connected to one of the opposing ends of the legs via a fold and each of the braces may be connected to one of the leg extensions via a fold as well. Each of the leg extensions and a portion of the connected brace are positioned generally parallel to and between the leg and the support surface when the legs are in their collapsed configuration.

BRIEF DESCRIPTION OF THE DRAWINGS

FIG. 3c is a bottom plan view of the raised platform of FIG. 1 showing the legs in the fully collapsed configuration;

FIG. 4 is a front elevation view of the raised platform of FIG. 1;

FIG. 5 is a side elevation view of the raised platform of FIG. 1;

FIG. 6 is a bottom plan view of a unitary blank for forming the raised platform of FIG. 1;

FIG. 10b is a bottom plan view of the raised platform of FIG. 9 showing the legs in a position between the fully expanded configuration and a fully collapsed configuration;

FIG. 10c is a bottom plan view of the raised platform of FIG. 9 showing the legs in the fully collapsed configuration;

FIG. 11 is a bottom plan view of a unitary blank for forming the raised platform of FIG. 9;

DETAILED DESCRIPTION OF THE DRAWINGS

Figure 1:
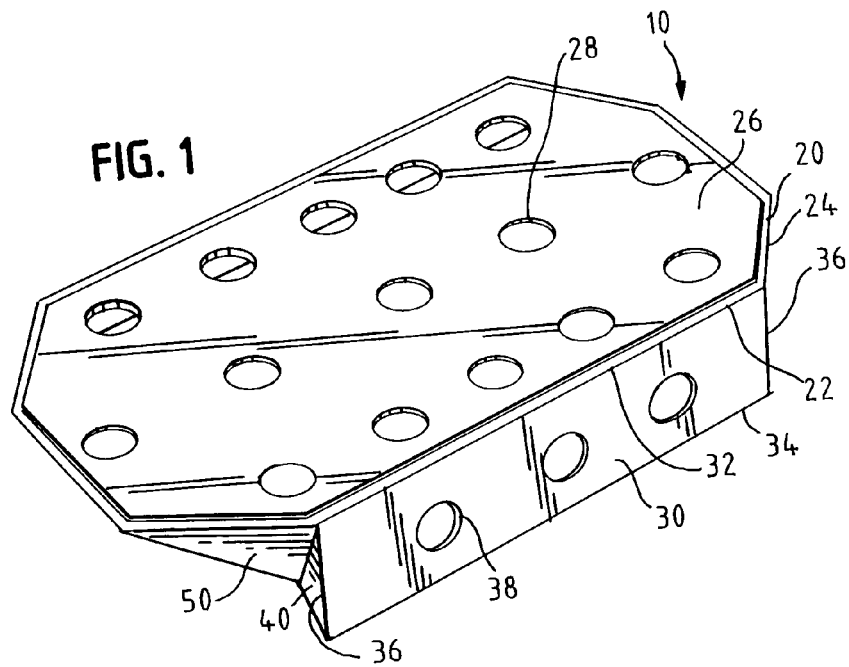
FIG. 1 is a top perspective view of a first embodiment of a raised platform for microwave cooking of a food product.
Figure 2:
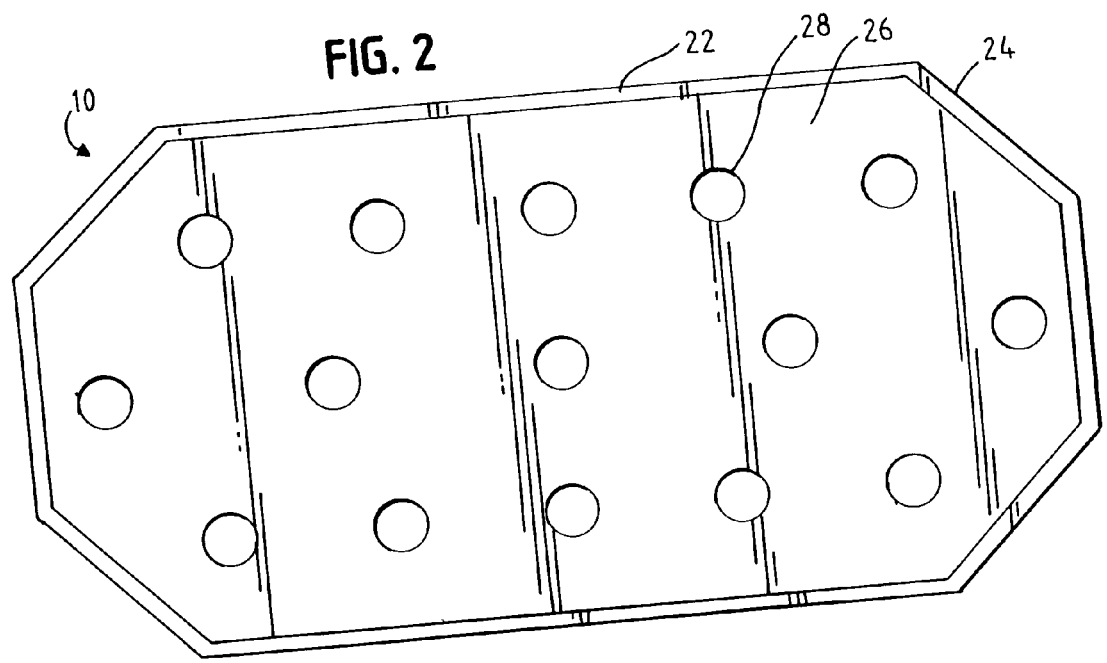
FIG. 2 is a top plan view of the raised platform of FIG. 1.

Various embodiments of raised platforms for microwave cooking in accordance with the above-discussed aspects are illustrated in FIGS. 1-13 herein. The raised platforms are convertible between a collapsed configuration and an expanded configuration. In the expanded configuration, legs are extended to elevate the susceptor of the base tray, and thus the food product, above the floor of a microwave during the cooking cycle to promote more even microwave cooking, particularly of the bottom of the food product, as will be explained in greater detail herein.

In use, the product support surface 20 or 120 of the raised platform 10 or 110 supports a food product 12 at least partially on a susceptor surface 26 or 126 at a position elevated above the bottom floor of a microwave oven. The susceptor surface 26 or 126 provides for conductive heating of the portions of the food product in contact herewith. Legs 30 or 130 are provided to support the product support surface 20 or 120 in the elevated position.

In microwave cooking, polar molecules such as water contained in the food product absorb microwave energy and release heat. Microwave energy typically penetrates further into the food than does heat generated in a conventional oven, such as radiant heat, with the result that water molecules dispersed throughout the food product are selectively heated more rapidly. Ideally, food products such as those in dough-based portions of pizza, sandwiches, pockets and other such food products should properly dissipate the heated moisture in order to avoid the dough-based portion becoming soggy.

The food product being prepared is preferably supported at an elevated position above the bottom surface of a microwave oven to allow a desirable portion of the moisture exiting the food product, such as if vents holes 28 or 128 are present in the food product support surface 20 or 120, to become trapped in a determined volume so as to contribute controlled amounts of heat and moisture to the dough-based portion of the food product 12 and to achieve a desirable brownness or crispness of an adjacent dough-based portion 14 without becoming dried out, chewy or hard. Thus, it can be preferable to achieve a proper ratio of moisture exiting the food product being prepared between a trapped portion used for heating of the food product and a released portion which is allowed to escape the food product to prevent its becoming soggy or chewy or otherwise undesirably moist.

In addition, supporting the food product 12 at an elevated position above the bottom surface of a microwave oven allows for cooking energy, such as microwaves, to be deflected on the bottom surface of the microwave oven and redirected to underneath the food product in order to reach the bottom portion of the food product.

Other problems associated with the use of microwave energy for the preparation of food products such as frozen or refrigerated sandwich, pockets and the like are also addressed. In general, certain instances of non-uniform heating can be associated with the preparation of food using microwave energy, such as electromagnetic radiation at a frequency of about 0.3 to 300 GHz. It can be important in order to achieve a cooked food product of pleasing appearance and texture that the dough-based portion of the food product be uniformly heated throughout the cooking. As is now generally accepted, power distribution in a microwave oven cavity can be non-uniform, giving rise to "hot spots" and "cold spots" about the environment of the food product being prepared.

Another problem in many practical applications arises from the fact that a food product such as a frozen sandwich typically does not exhibit desirably uniform temperature response to microwave radiation throughout its volume, during a typical heating cycle. For example, a frozen sandwich when initially subjected to microwave radiation, undergoes local melting or thawing in certain portions of the sandwich, with remaining portions of the sandwich remaining frozen. This problem is accelerated in that thawed portions of a dough-based food product, such as a sandwich, pocket or the like, will preferentially absorb greater amounts of microwave energy than the surrounding frozen portions. A further understanding of difficulties encountered in preparing dough-containing food products such as frozen pizza may be found in U.S. Pat. No. 5,416,304, the disclosure of which is herein incorporated by reference as fully set forth herein. It is important therefore that initial thawing of the food product be made as uniform as possible throughout the food product and that the energy absorption throughout the remainder of the cooking cycle remain uniform. A number of different features of the cooking apparatus disclosed herein provide improved control of microwave cooking of dough-containing food products, throughout the cooking cycle.

In use, the legs 30 or 130 elevate the food support surface 20 or 120, and thus the food product 12, above the bottom floor of a microwave oven. The food product support surface 20 or 120 cooperates with the legs 30 or 130 to form a partially enclosed cavity beneath the food product 12 that is disposed on top of the susceptor surface 26 or 126 of the raised platform 10 or 110. Preferably, the legs 30 or 130 raise the food product support surface 20 or 120 an elevation sufficient to allow for microwaves to reflect off of the sidewalls and bottom wall of a microwave and be redirected to the underside of the food product support surface 20 or 120, i.e., the side opposite the susceptor surface 26 or 126, to provide for heating of the bottom of the food product 12. For example, the legs 30 or 130 may elevate the food product support surface 20 or 120 between about 0.25 and 1.75, and preferably about 1 inch, above the bottom wall of a microwave oven.

A series of aligned apertures 28 or 128 may be formed in the food product support surface 20 or 120 and susceptor 26 or 126 to allow steam vapor exiting the food product 12 during the cooking cycle to enter the cavity below the food product support surface 20 or 120 and between the legs 30 or 130. Excess amounts of steam, or water vapor beyond that desired, can exit the cavity through vents 38 or 138 in the legs 30 or 130 and other openings. A defined amount of steam can be trapped beneath the food product support surface 20 or 120 to provide an amount of additional heating to the food product 12 as well as maintaining moisture control of the food product environment during the cooking cycle.

In the first embodiment illustrated in FIGS. 1-8, the raised platform 10 includes a food product support surface 20 having a susceptor 26 thereon. The food product support surface 20 has a pair of parallel, opposing side edges 22. A leg 30 depends from each of these parallel, opposing side edges 22 in order to elevate the food product support surface 20, such as above the bottom of a microwave oven. A pair of leg extensions 40, each with a connected brace 50 relative to an edge 24 of the product support surface 20, are provided on each of the legs 30 for providing additional stability to the product support platform 10 in its expanded configuration. The leg extensions 40 provide the additional stability by assisting in supporting the raised platform 20 and by, in cooperation with the associated braces 50, assisting in maintaining the legs 30 in a generally perpendicular arrangement with the product support surface 20 when the raised platform 10 is in its extended configuration.

Turning now to more of the details of the legs 30, leg extensions 40 and braces 50, each of the pair of legs 30 is rectangular, having a top edge 32, an opposite bottom edge 34, and a pair of side edges 36. The top edge 32 of each of the legs 30 is connected to an edge 22 of the food product support surface 20. The side edges 36 of each of the legs 30 each have a leg extension 40 connected thereto. The leg extensions 40 are generally shaped as right isosceles triangles, connected at one side 42 to the side end edge of the associated leg. A free side is positioned to be generally in the same plane as the bottom edge of the associated leg to provide additional support for the food product support surface when the raised platform is in its expanded configuration. The hypotenuse side of the leg extension is connected to a brace. The brace extends from the leg extension to an edge of the product support surface, and assists in maintaining the leg extension in its preferred orientation when the raised platform is in its expanded configuration. The braces are generally shaped as right isosceles triangles, with one of the two shorter sides connected to the associated leg extension and the other of the two shorter sides connected to a side edge of the product support platform.

Figure 3A:
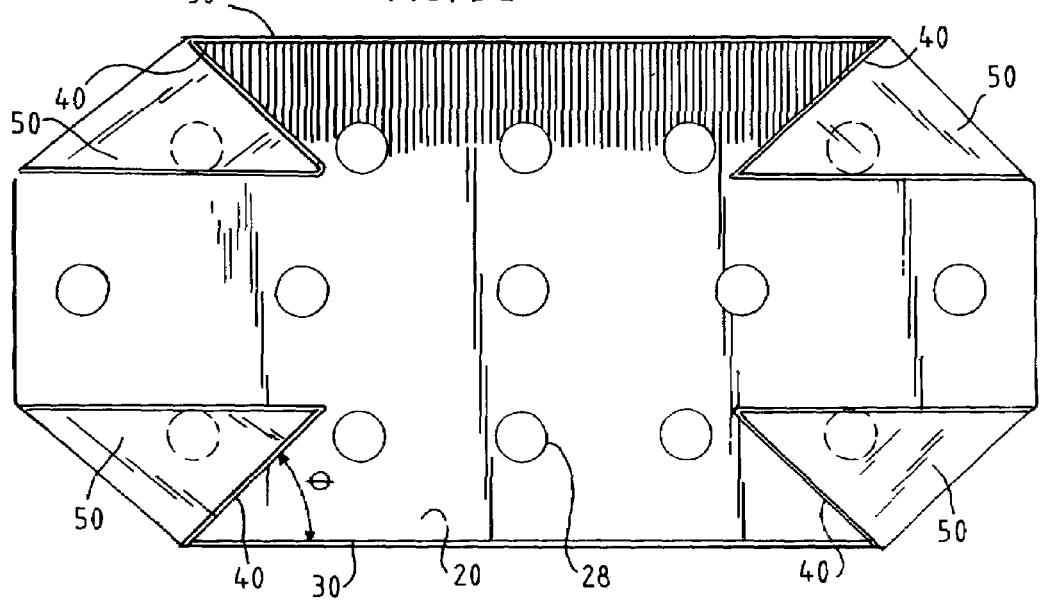
FIG. 3a is a bottom plan view of the raised platform of FIG. 1 showing the legs in a fully expanded configuration.
Figure 3B:
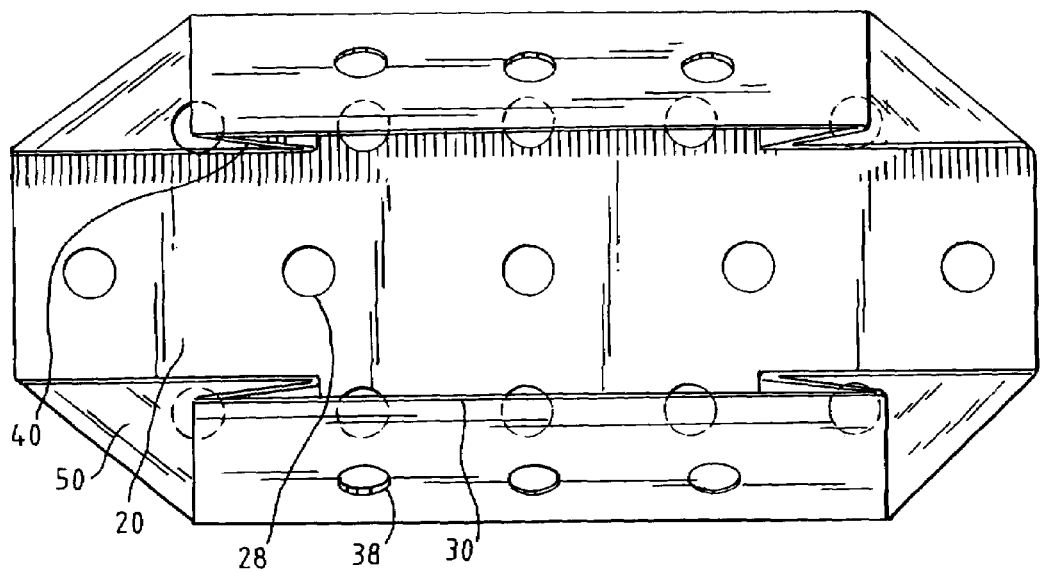
FIG. 3b is a bottom plan view of the raised platform of FIG. 1 showing the legs in a position between the fully expanded configuration and a fully collapsed configuration.
Figure 7A:
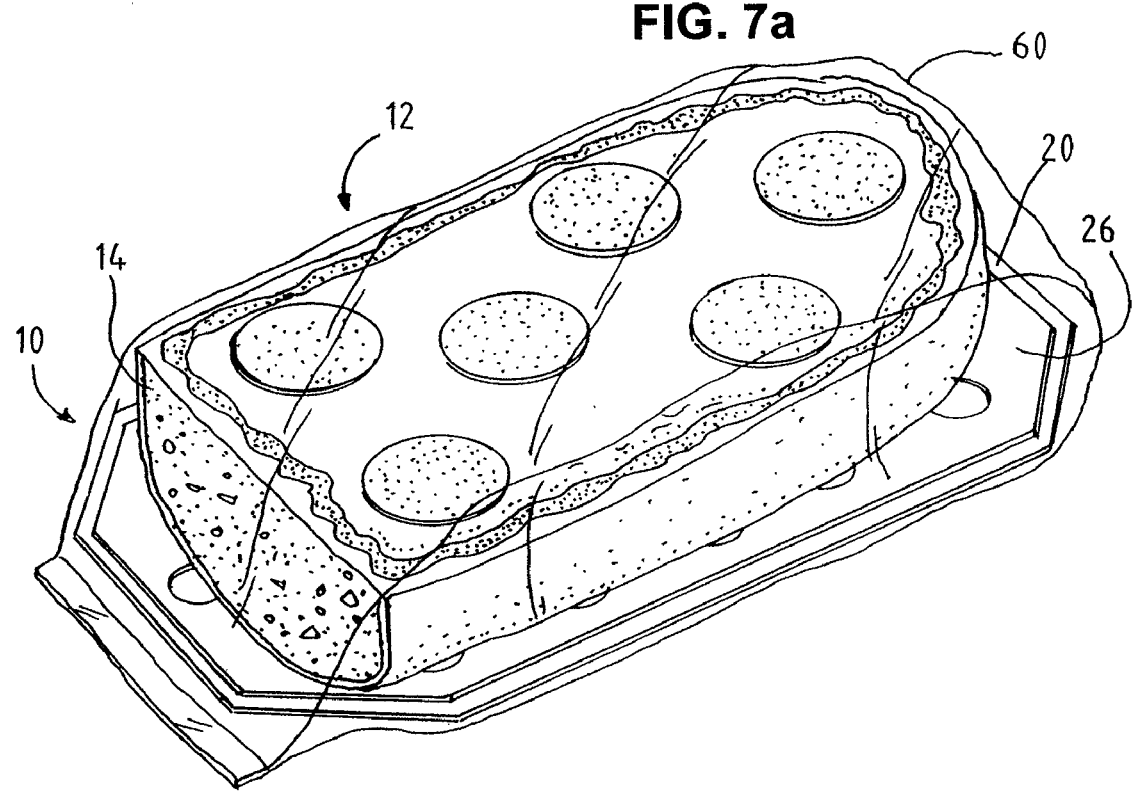
FIG. 7a is a perspective view of the raised platform of FIG. 1 shown in a collapsed configuration in combination with a food product and an outer film wrapper.
Figure 7B:
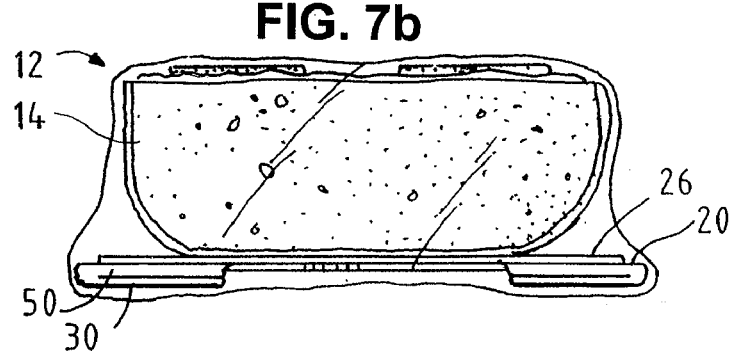
FIG. 7b is an end elevation view of the raised platform in its collapsed configuration, food product and outer film wrapper combination of FIG. 7.

When the raised platform 10 is in its fully collapsed configuration, as illustrated in FIG. 3c, the legs 30, leg extensions 40, braces 50 and food product support surface 20 are all generally parallel. More specifically, in the fully collapsed configuration the braces 50 are adjacent the underside of the food product support surface, the leg extensions 40 are adjacent the braces 50, and the legs 30 are adjacent the leg extensions 40. This configuration results in the raised platform 10 having a minimal thickness, which advantageously can allow the raised platform 10 to have a slim profile and thereby reduce the size of a packaged raised platform and food product as compared to the raised platform 10 as compared to the raised platform in its expanded configuration for heating. When the raised platform 10 of the first embodiment is in its fully expanded configuration, as illustrated in FIGS. 1, 3a, 4, 5, 8 and 8a, the legs 30 and leg extensions 40 are orientated generally perpendicular to the product support surface 20 in order to elevate the product support surface 20 a predetermined distance.

In the second embodiment illustrated in FIGS. 9-13, the raised platform 110 includes a generally rectangular food product support surface 120 having a susceptor 126 thereon. The food product support surface 120 has a pair of parallel, opposing side edges 122. A primary leg 130 depends from each of these parallel, opposing side edges 122 in order to elevate the food product support surface 120, such as above the bottom of a microwave oven. Supplemental legs 150 depend from opposing side edges 124 of the product support surface 120 which lack the primary legs 130. Each of the pair of legs 130 has a top edge 132, an opposite bottom edge 134, and a pair of side edges 136. The top edge 132 of each of the primary legs 130 is connected to an edge 122 of the food product support surface 120 via a fold. Each of the supplemental legs 150 has a top edge 154 connected to an edge 124 of the food product support surface via a fold, an opposite bottom edge 162, and a pair of end edges 158.

The side edges 158 of each of the supplemental legs 150 each have a connecting tab 152 attached thereto. When fully assembled, the connecting tabs 152 are adhesively secured to inner surfaces of the adjacent primary legs 130 to effectively connect the primary and supplemental legs 130 and 150. The connection between the primary and supplemental legs 130 and 150 provides additional stability to the product support platform 110 in its expanded configuration and assists in maintaining the primary and supplemental legs 130 and 150 in a generally perpendicular arrangement with the product support surface 120 when the raised platform 110 is in its expanded configuration.

When the raised platform 110 is fully assembled, with the connecting tabs 152 securing the primary and supplemental legs relative 130 and 150 to each other, the raised platform 110 preferably is predisposed to have the legs 130 and 150 in or close to their expanded configuration, where the legs 130 and 150 are generally perpendicular to the food product support surface 120, as illustrated in FIGS. 9, 10a, 12a and 12b. To assist in shifting the raised platform 110 from its expanded configuration to its collapsed configuration, the primary legs 130 have a diagonal fold line 160 positioned adjacent each of the end edges 136. The fold lines 160 extend from proximate an upper corner of each of the primary legs 130, adjacent the upper edges 132 of the legs 130, toward the bottom edges 134 of the legs 130 and inwardly from the end edges 136. The fold lines 160 permit the primary and supplemental legs 130 and 150 to be shifted from their generally perpendicular orientations relative to the product support surface 120 to their collapsed orientations where they are generally parallel to the product support surface 120, as illustrated in FIGS. 10b and 10c. When the raised platform 110 is in its fully collapsed configuration, as illustrated in FIG. 10c, end regions of the primary legs 130 are disposed between the supplemental legs 150 and the inner side of the product support surface 120.

The end edges 136 of the primary legs 130 do not have to be straight and perpendicular relative to the top and bottom edges 132 and 134 of the primary legs 130, as illustrated by way of example in FIG. 11. Instead, the end edges 136 of the primary legs 130 may include an inclined edge portion 164 aligned with the portion of the fold line 160 adjacent the upper edge 132 and a protruding edge portion 166 adjacent the bottom edge 134. The inclined edge portion 164 can assist in maintaining the leg extension in its preferred orientation when the raised platform is in its expanded configuration, and can reduce the length of the fold line 160 and allow for greater flexibility in the preciseness of the placement of the fold line 160.

Figure 9:
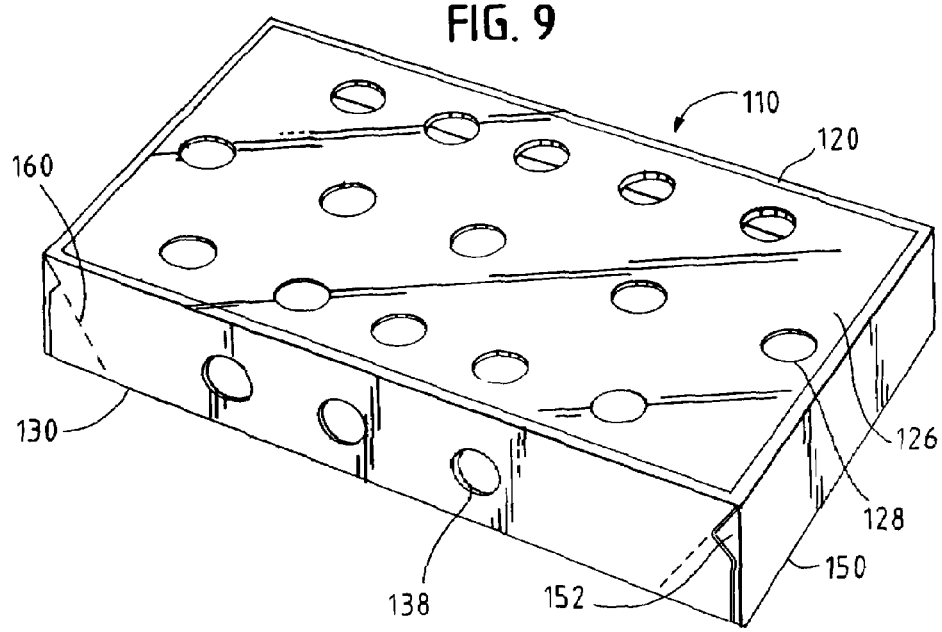
FIG. 9 is a top perspective view of a second embodiment of a raised platform for microwave cooking of a food product.
Figure 10A:
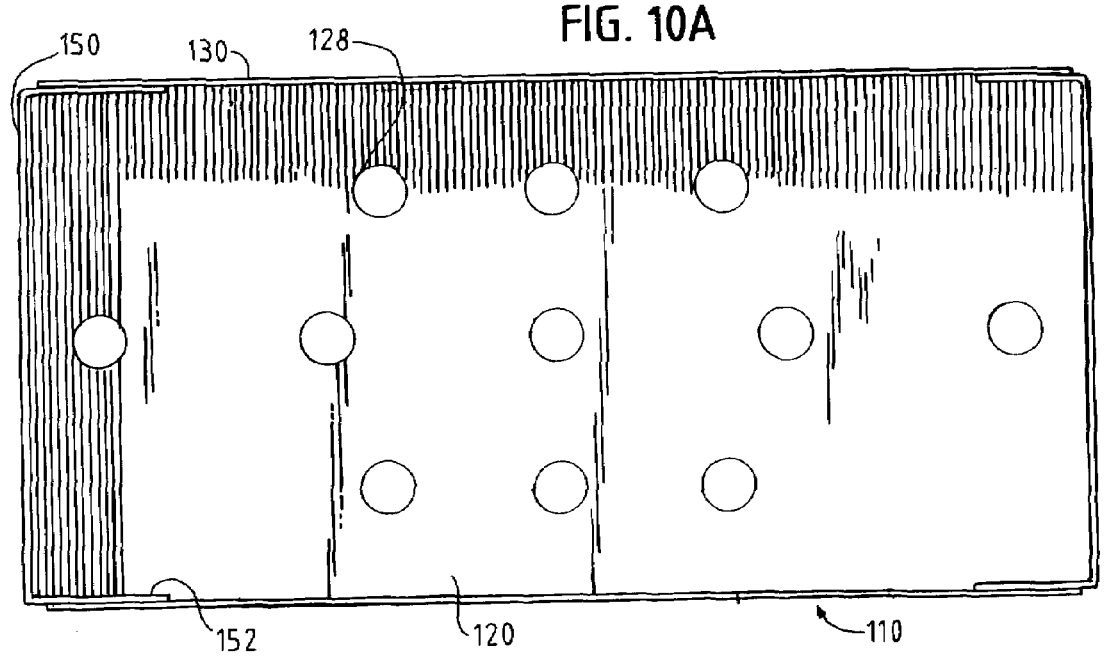
FIG. 10a is a bottom plan view of the raised platform of FIG. 9 showing the legs in a fully expanded configuration.
Figure 12A:
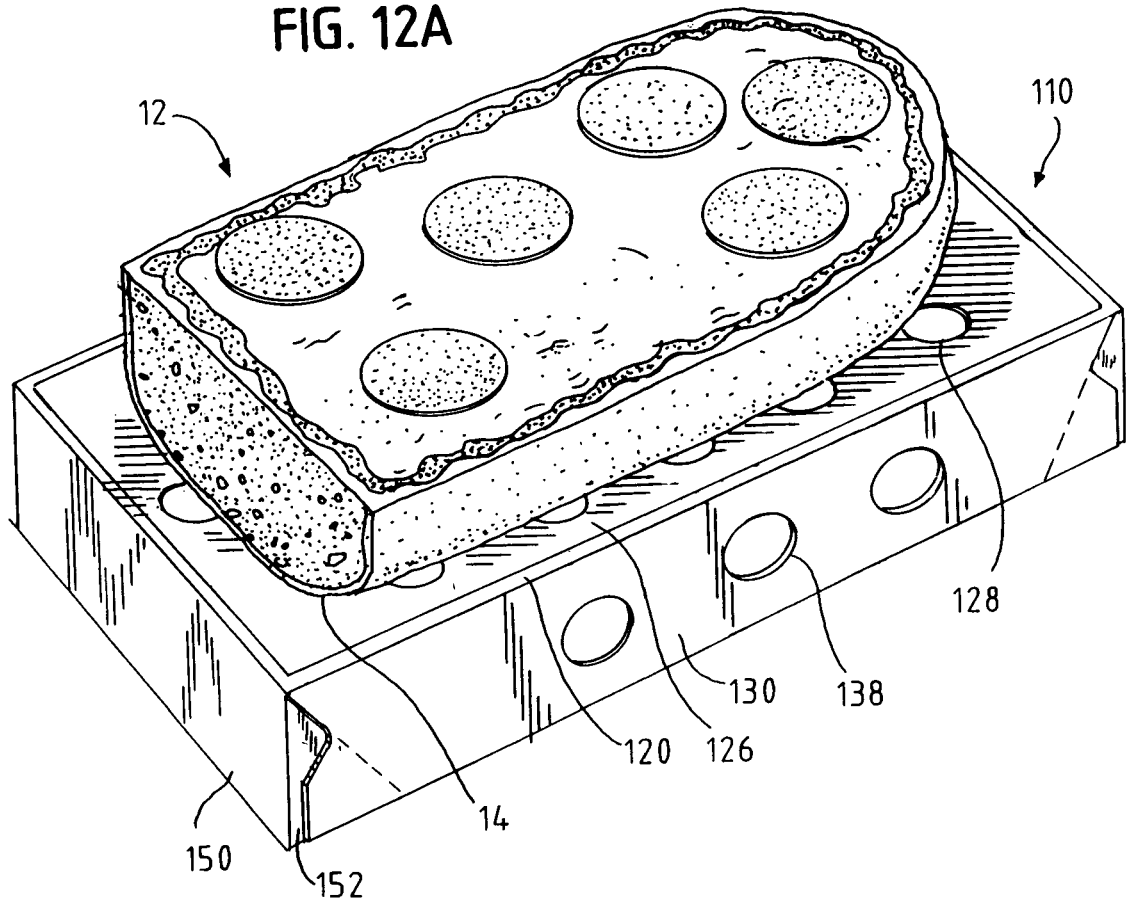
FIG. 12a is a perspective view of the raised platform of FIG. 9 shown in a collapsed configuration in combination with a food product and an outer film wrapper.
Figure 12B:
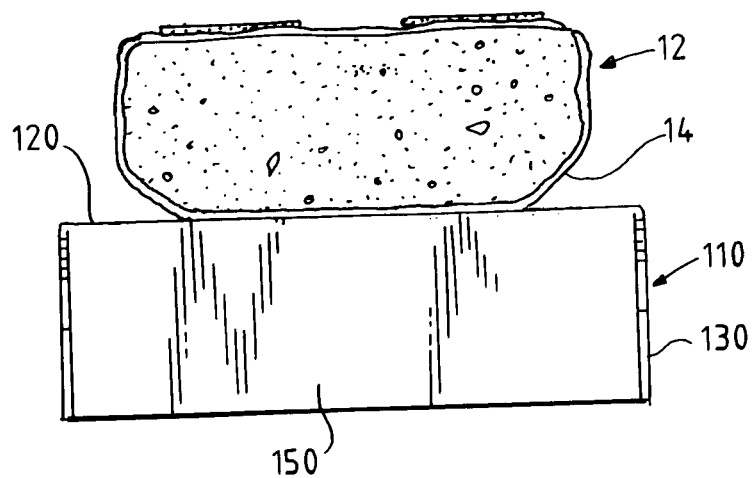
FIG. 12b is an end elevation view of the raised platform in its collapsed configuration, food product and outer film wrapper combination of FIG. 12.
Figure 13A:
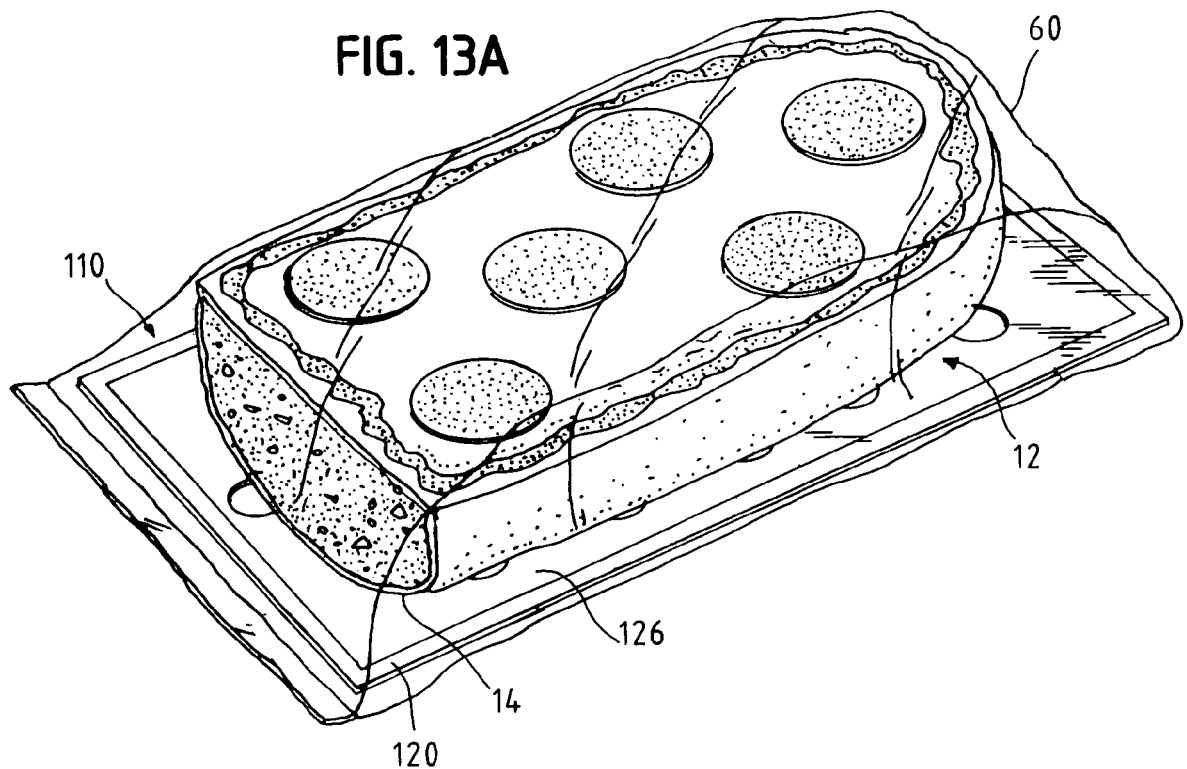
FIG. 13a is a perspective view of the raised platform of FIG. 9 shown in an expanded configuration in combination with a food product.
Figure 13B:
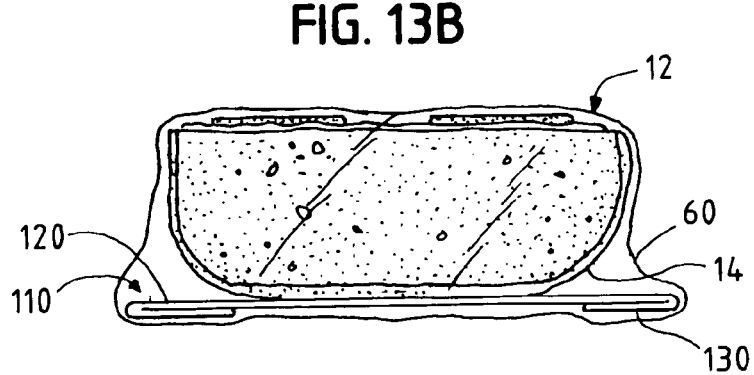
FIG. 13b is an end elevation view of the raised platform in its expanded configuration in combination and food product combination of FIG. 13.

This configuration results in the raised platform 110 having a minimal thickness, which advantageously can allow the raised platform 110 to have a slim profile and thereby reduce the size of a packaged raised platform and food product as compared to the raised platform 110 in its expanded configuration for heating. When the raised platform 110 of the second embodiment is in its fully expanded configuration, as illustrated in FIGS. 9, 12a and 12b, the primary legs 130 and the supplemental legs 150 are orientated generally perpendicular to the product support surface 120 in order to elevate the product support surface 120 a predetermined distance, such as above the floor of a microwave oven.

The raised platform 10 or 110 may be packaged in combination with a food product 12, and may be packaged in combination with a dough-based food product 12 that has a dough-based exterior portion 14. When provided in combination with a food product 12, the raised platform 10 or 110 may initially be in its collapsed configuration and the food product 12 can be disposed on the product support surface 20 or 120. Preferably at least part of the dough-based exterior portion 14 of the food product 12 is adjacent the susceptor surface 26 or 126. An outer film 60, such as a shrinkable film, surrounds both the food product 12 and the raised platform 10 or 110 in its collapsed configuration to both provide a protective barrier for the food product 12 and to maintain the raised platform 10 or 110 in its collapsed configuration, as illustrated in FIGS. 7a, 7b, 12a and 12b.

Figure 8A:
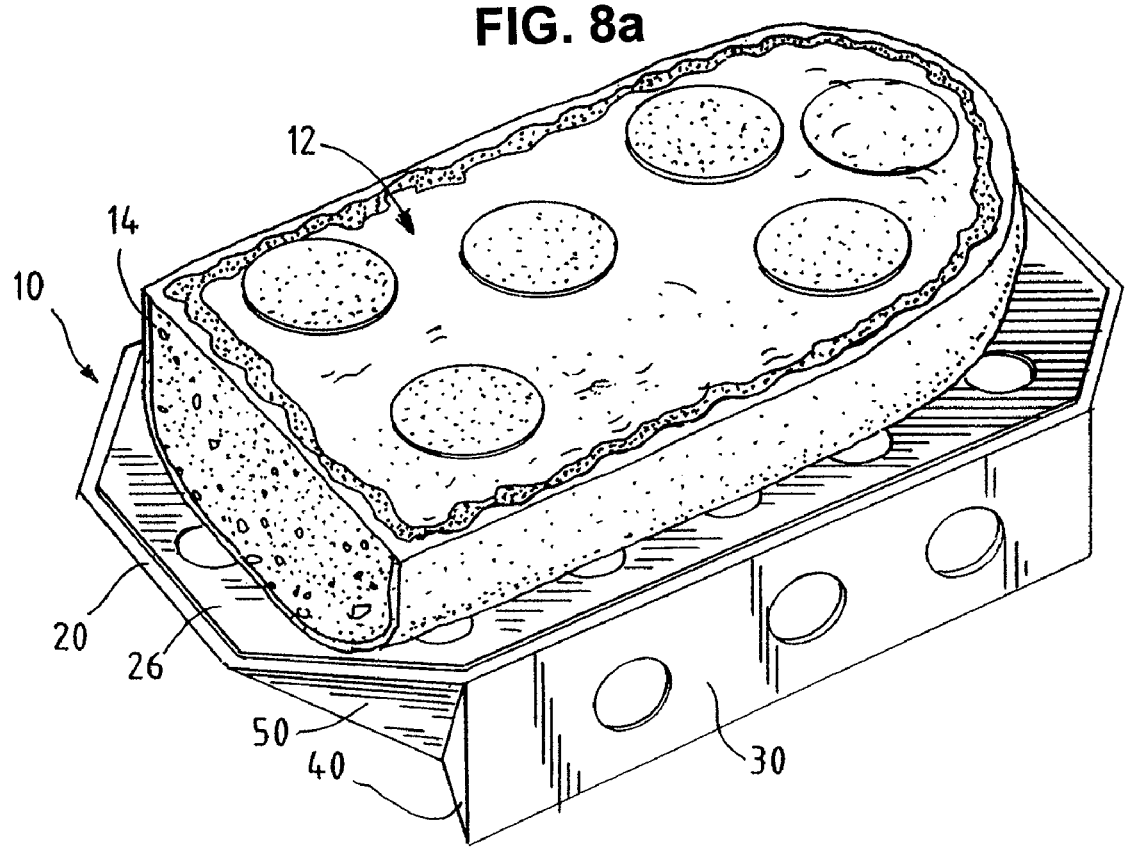
FIG. 8a is a perspective view of the raised platform of FIG. 1 shown in an expanded configuration in combination with a food product.
Figure 8B:
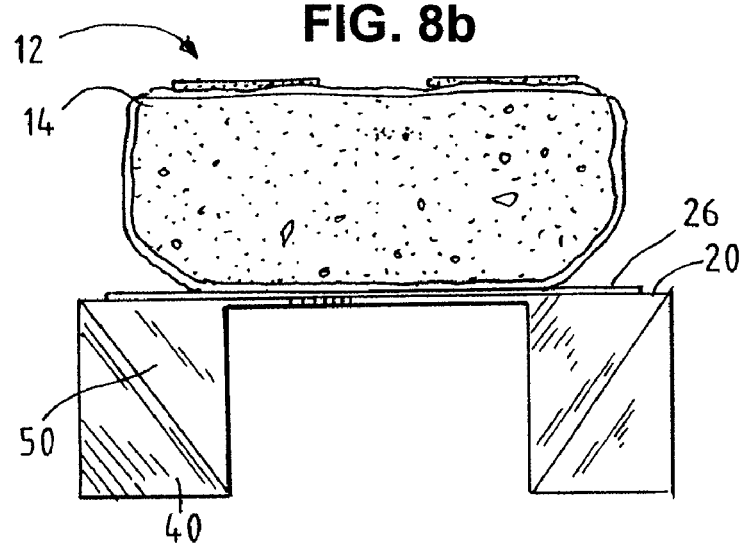
FIG. 8b is an end elevation view of the raised platform in its expanded configuration in combination and food product combination of FIG. 8.

When it is desired to heat the food product 12, the outer film 60 can be removed to both expose the food product 12 and, in the first embodiment of the raised platform 10, to release the legs 30, leg extensions 40 and braces 50 from their collapsed configuration and allow them to be shifted to their expanded configuration, as illustrated in FIGS. 8a and 8b. In the second embodiment of the raised platform 110, removal of the outer film 60 both exposes the food product 12 and releases the primary legs 130 and supplemental legs 150 from their collapsed configuration and allows them to be shifted to their expanded configuration, as illustrated in FIGS. 12a and 12b. Depending upon the material used for the raised platform 10 or 110, the shifting from the collapsed configuration to the expanded configuration may occur automatically, or may require some manual manipulation of the legs 30 or 130 and 150 by a user. To this end, finger recesses, such as arcuate cut-outs, may be provided in the legs 30 or 130 or 150 for a user to grasp the legs 30 or 130 or 150 and shift them to their expanded configuration. The finger recesses may also be sized to provide a convenient location for a user to remove the raised platform 10 or 110 with the food product 12 thereon after heating.

The raised platforms 10 and 110 disclosed herein are particularly suitable for use with food products having an outer dough-based portion. For example, the raised platforms 10 and 110 can be used in microwave heating of a food product 12 that comprises French bread having toppings, such a pizza toppings, and an outer crust 14 on the bottom. Other examples of food products having dough-based portions include sandwiches, calzones, pitas, pizzas, strombollis and other such dough-enrobed or dough-based food products. The dough-based portions of the food products can be in various forms, such as cooked, par-baked, raw, ready-to-heat, ready-to-eat, proofed or unproofed dough which is suitable for being cooked, browned, and/or crisped.

Preferably, though not necessarily, the raised platforms 10 and 110 are formed from a single unitary blank 16 or 116 of material, such as paperboard. Forming the raised platforms 10 or 110 from a single unitary blank 116 can eliminate the need for separately attaching any of the legs 30 or 130, leg extensions 40 or 140 and braces 50, if present, to each other or to the product support surface 20 or 120. With specific respect to the first embodiment of the raised platform 10, another advantage of forming the raised platform 10 from a unitary blank 16 is that adhesives are not required to join any of the legs 30, leg extensions 40 and braces 50 to each other or to the product support surface 20, thereby eliminating steps in the manufacturing process and providing for simplified construction of the raised platform 10.

With respect to the first embodiment, the unitary blank 16 may be provided with a plurality of fold lines, such as weakened or scored lines, as illustrated in FIG. 6, for assisting in folding of the blank 16 into the raised platform 10. The unitary blank 16 includes a pair of parallel fold lines between the adjacent edges 22 and 32 of the product support surface 20 and the legs 30. The unitary blank 16 also includes fold lines between the side edges 36 of the legs 30 and the adjacent edges 42 of the leg extensions that perpendicularly intersect the parallel fold lines between the product support surface 20 and the legs 30. Fold lines are also positioned between adjacent edges 46 and 56 of the leg extensions 40 and connected brace 50, and between adjacent edges 54 and 24 of the braces 50 and product support surface 20.

With respect to the second embodiment, the unitary blank 116 may be provided with a plurality of fold lines, such as weakened or scored lines, as illustrated in FIG. 11, for assisting in folding of the blank 116 into the raised platform 110. The unitary blank 116 includes fold lines between the adjacent edges 122 and 132 of the product support surface 120 and the primary legs 130. Fold lines are also positioned between adjacent edges 124 and 154 of the product support surface 120 and the supplemental legs 150. Fold lines are also positioned between edges 158 and 156 of the supplemental legs 150 and the tab connectors 152. Furthermore, the fold lines 160 at each end of the primary legs 130 are also positioned on the blank 116.

The susceptor 26 or 126 can be attached either when the platform 10 or 110 has been formed or to the unitary blank 16 or 116 prior to its folding into the platform 10 or 116, or at intermediate steps thereof. For example, the susceptor 26 or 126 can be attached to the portion of the unitary blank 16 or 116 that will become the product support surface 20 or 120 prior to folding into the raised platform 10 or 110. However, it is preferable, though not necessary, that the optional vents 38 or 138 in the legs 30 or 130 and the vents in the product support surface 20 or 120 and susceptor 26 or 126 are formed prior to folding of the blank 16 or 116 into the raised platform 10 or 110 and after the susceptor 26 or 126 has been attached to the blank 16 or 116. This will permit the simultaneous forming of the aligned vents in the product support surface 20 or 120 and the susceptor 26 or 126.

Various types and forms of susceptors 26 or 126 can be utilized with the raised platform 10 or 110. For example, the susceptor 26 or 126 may be a film having a layer of metal deposited thereon. Alternatively, the susceptor 26 or 126 may be printed upon the blank 16 or 116, thereby eliminating the need for separate attachment, such as with adhesives. In addition, the susceptor 26 or 126 may have different thickness to assist in concentrating heat energy at select portions of the food product. By graduating the amount of susceptor material or coating, over heating of select portions of the food product can be avoided during cooking. Virtually any pattern of susceptor 26 or 126 can be employed. For example, the susceptor 26 or 126 can be coated or printed as a series of space-apart diagonal stripes or can comprise an array of dots or other shapes.

The susceptor 26 or 126 may be of a type that expands upon heating to better conform to the adjacent portion of a food product, which can be advantageous if the adjacent portion of the food product has surface irregularities or is slightly curved, and thus not entirely planar. To accommodate these irregularities and promote more contact with the adjacent portion of a food product, the susceptor 26 or 126 may expand upon heating. One type of expanding susceptor material is made and sold by Graphics Packaging, Inc. under the product name QuiltWave.™. As the susceptor 26 or 126 expands, it can at least partially contact some of the non-planar portions of the adjacent portion of a food product.

In accordance with one example of a raised platform 10 in accordance with the first embodiment, the product support surface 20 may be about 7 inches long by about 3.5 inches wide, and the legs 30 may have a height of about 1 inch. A unitary paperboard blank 16 for forming such a platform 10 may be about 7 inches by about 5.5 inches. The product support surface 20 for such a platform 10 may be generally octagonal, and may have six sides about the same length and two sides that are each longer than any three of the six sides that are about the same length. In accordance with another example of a raised platform, the platform may be about 5 inches long by about 3.5 inches wide, and may have a height of about 1 inch. A unitary paperboard blank for forming such a platform may be about 5 inches by about 5.5 inches.

In order to convert the unitary blank 16 in this example into the raised platform 10, the blank 16 may be forced into a mold cavity. More specifically, a mold cavity having an opening about the same size as the blank 16 may be provided with corner portions that are gradually sloped. As a forming tool depresses the blank 16 into the mold cavity, the corner portions thereof contact the legs 30 adjacent the fold lines between the legs 30 and the product support surface 20 and the braces 50 adjacent the fold lines between the braces 50 and the product support surface 20 to cause the legs 30 and the braces 50 to fold about their fold lines relative to the product support surface 20, which also causes the leg extensions 40 to fold about the fold lines between the legs extensions 40 and the legs 30 and the braces 50. Once removed from the mold cavity, folding bars or other means may be used to fold the legs 30, extension legs 40 and braces 50 into their fully collapsed configurations.

In one alternative method, folding bars may be used to form the unitary blank 16 into the raised platform 10. For example, a pair of curved folding bars may be positioned parallel to the legs 30 and in a machine direction. As the blank 16 is advanced in the machine direction, the folding bars fold the legs 30 about the fold lines adjacent the product support surface 20, thereby causing the leg extensions 40 and braces 50 to fold about their respective fold lines.

In accordance with another example of a raised platform 110 in accordance with the second embodiment, the product support surface 120 may be about 7 inches long by about 3.5 inches wide, and the legs 130 may have a height of about 1 inch. A unitary paperboard blank 116 for forming such a platform 110 may be about 7 inches by about 5.5 inches. The product support surface 120 for such a platform 110 may be generally octagonal, and may have six sides about the same length and two sides that are each longer than any three of the six sides that are about the same length. In accordance with another example of a raised platform, the platform may be about 5 inches long by about 3.5 inches wide, and may have a height of about 1 inch. A unitary paperboard blank for forming such a platform may be about 5 inches by about 5.5 inches.

The drawings and the foregoing descriptions are not intended to represent the only forms of the raised platform in regard to the details of construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation.

The invention claimed is:

1. A raised platform for microwave cooking of a food product, the raised platform comprising:
   a generally planar, octagonal support surface for supporting a food product during microwave cooking thereof, the generally planar support surface having a length and a width, the length being greater than the width, and having a pair of substantially parallel opposing side edges extending along a portion of the length of the support surface;
   a pair of generally rectangular legs depending from the parallel opposing sides of the support surface for supporting the support surface in a raised position, each of the legs having an extension leg attached via a fold at one end of the leg, each of the extension legs having a brace attached thereto via a fold and each of the braces attached to the product support surface via a fold, the extension legs providing additional support for the support surface and the braces providing support for the extension legs; and a susceptor surface disposed on the majority of the support surface for conducting heat to a food product thereon during microwave cooking.

2. A raised platform for microwave cooking of a food product in accordance with claim 1, wherein the support surface and susceptor surface have a plurality of aligned vent holes formed therein for venting moisture from a food product during microwave cooking.

3. A raised platform for microwave cooking of a food product in accordance with claim 2, wherein the legs each have a plurality of vent holes formed therein for venting moisture from a food product during microwave cooking.

4. A raised platform for microwave cooking of a food product in accordance with claim 1, wherein the support surface, the legs, the extension legs and the braces are formed from a unitary paperboard material.

5. A raised platform for microwave cooking of a food product in accordance with claim 4, wherein the extension legs are generally right isosceles triangles.

6. A raised platform for microwave cooking of a food product in accordance with claim 5, wherein each of the extension legs are connected along their hypotenuse to the extension leg brace, each of the extension braces extending between the extension legs and a side edge of the support platform adjacent an end of the parallel opposing sides of the support surface, the extension braces being generally isosceles triangles.

7. A raised platform for microwave cooking of a food product in accordance with claim 6, wherein each of the legs are connected to one of the parallel opposing sides of the support surface via a fold, the legs pivotable about the fold between a first position generally perpendicular to the support surface and a second position generally parallel to the support surface.

8. A raised platform for microwave cooking of a food product in accordance with claim 7, wherein each of the extension legs and a portion of the connected brace being positioned generally parallel to and between the leg and the support surface when the legs are in their first position.

9. A raised platform for microwave cooking of a food product in accordance with claim 8, including, in combination, a food product.

10. A raised platform for microwave cooking of a food product in accordance with claim 9, wherein food product has a dough-based portion having a footprint substantially the same size as the support surface.

11. A raised platform for microwave cooking of a food product convertible between a collapsed configuration and an expanded configuration, the raised platform comprising:

a generally planar support surface for supporting a food product during microwave cooking thereof, the generally planar support surface having a pair of substantially parallel opposing side edges and a susceptor surface disposed on the majority of the support surface for conducting heat to a food product thereon during microwave cooking;

a pair of longitudinal extending legs depending from the parallel opposing sides of the support surface for supporting the support surface in a raised position, each of the legs having an extension leg attached via a fold at one end of the leg for providing additional support for the support surface, the pair of longitudinal extending legs and the extension legs being generally parallel to the support surface in the collapsed configuration and being generally perpendicular to the support surface in the expanded configuration;

wherein the support surface is octagonal and the support surface has a length greater than its width, the legs being mounted to side edges of the support surface along the entire length thereof, the side edges to which the legs are mounted being longer than other edges of the support surface;

wherein the extension legs are generally right isosceles triangles; and each of the extension legs are connected along their hypotenuse to an extension leg brace, each of the extension braces extending between the extension legs and a side edge of the support platform adjacent an end of the parallel opposing sides of the support surface, the extension braces being generally isosceles triangles.

12. A raised platform for microwave cooking of a food product in accordance with claim 11, wherein:

each of the legs are connected to one of the parallel opposing sides of the support surface via a fold, the legs pivotable about the fold between a first position generally perpendicular to the support surface and a second position generally parallel to the support surface; and each of the leg extensions is connected to one of the opposing ends of the legs via a fold and each of the braces is connected to one of the leg extensions via a fold, each of the leg extensions and a portion of the connected brace being positioned generally parallel to and between the leg and the support surface when the legs are in their collapsed configuration.

13. A raised platform for microwave cooking of a food product convertible between a collapsed configuration and an expanded configuration, the raised platform comprising:

a generally planar support surface for supporting a food product during microwave cooking thereof, the generally planar support surface having a pair of substantially parallel opposing side edges and a susceptor surface disposed on the majority of the support surface for conducting heat to a food product thereon during microwave cooking;

a pair of longitudinal extending legs depending from the parallel opposing sides of the support surface for supporting the support surface in a raised position, each of the legs having an extension leg attached via a fold at one end of the leg for providing additional support for the support surface, the pair of longitudinal extending legs and the extension legs being generally parallel to the support surface in the collapsed configuration and being generally perpendicular to the support surface in the expanded configuration;

a pair of generally rectangular, transversely extending braces depending from parallel, opposing sides of the support surface different from the sides of the support surface from which the longitudinally extending legs depend; and the extension legs are generally right isosceles triangles, each of the leg extensions is connected via a fold between their hypotenuse and an end of the legs and being connected to each of the extension braces extending between the extension legs and a side edge of the support platform adjacent an end of the parallel opposing sides of the support surface, the extension braces being generally isosceles triangles.

14. A raised platform for microwave cooking of a food product in accordance with claim 13, wherein the support surface, the legs, the leg extensions and the braces are formed from a unitary paperboard material.

15. A raised platform for microwave cooking of a food product convertible between a collapsed configuration and an expanded configuration, the raised platform comprising:

a generally rectangular, planar support surface for supporting a food product during microwave cooking thereof, a susceptor surface disposed on the majority of the support surface for conducting heat to a food product thereon during microwave cooking;

a first pair of opposing legs each having a longitudinal edge connected to one of a pair of first side edges of the support surface via a fold, the first pair of opposing legs being generally parallel to the support surface in the collapsed configuration and being generally perpendicular to the support surface in the expanded configuration;

a second pair of opposing legs connected to opposing second side edges of the support surface via folds, the second pair of opposing legs being generally parallel to the support surface in the collapsed configuration and being generally perpendicular to the support surface in the expanded configuration, each of the second pair of opposing legs being attached to opposite ends of each of the first pair of opposing legs; and a diagonal fold line positioned along the opposite ends of each of the first pair of opposing legs to permit the first and second pairs of opposing legs to be shifted from the expanded configuration to the collapsed configuration so that a portion of the first pair of opposing legs is disposed between a portion of the second pair of opposing legs and the support surface in the collapsed configuration.

16. A raised platform for microwave cooking of a food product in accordance with claim 15, wherein the diagonal fold lines each extend only part of a width of the first pair of opposing legs.

17. A raised platform for microwave cooking of a food product in accordance with claim 16, wherein the ends of the first pair of opposing legs include an inclined edge portion aligned with the adjacent diagonal fold line.

18. A raised platform for microwave cooking of a food product in accordance with claim 17, wherein the second pair of opposing legs are attached to opposite ends of each of the first pair of opposing legs via connector tabs.

19. A raised platform for microwave cooking of a food product in accordance with claim 18, wherein each of the connector tabs is attached via a fold to one end of each of the second pair of opposing legs.

* * * * *